(12) United States Patent
Im et al.

(10) Patent No.: US 11,313,157 B2
(45) Date of Patent: Apr. 26, 2022

(54) LATCH ASSEMBLY FOR OPENING AND CLOSING LUGGAGE ROOM OF VEHICLE

(71) Applicants: HYUNDAI MOTOR COMPANY, Seoul (KR); KIA CORPORATION, Seoul (KR); PYEONG HWA AUTOMOTIVE CO., LTD., Daegu (KR)

(72) Inventors: Yong-Hyuck Im, Seoul (KR); Young-Hoon Ko, Daegu (KR)

(73) Assignees: HYUNDAI MOTOR COMPANY, Seoul (KR); KIA CORPORATION, Seoul (KR); PYEONG HWA AUTOMOTIVE CO., LTD., Daegu (KR)

( * ) Notice: Subject to any disclaimer, the term of this patent is extended or adjusted under 35 U.S.C. 154(b) by 224 days.

(21) Appl. No.: 16/704,084

(22) Filed: Dec. 5, 2019

(65) Prior Publication Data

US 2020/0362601 A1 Nov. 19, 2020

(30) Foreign Application Priority Data

May 14, 2019 (KR) .......................... 10-2019-0056315

(51) Int. Cl.
*E05B 81/20* (2014.01)
*E05B 81/06* (2014.01)
(Continued)

(52) U.S. Cl.
CPC .............. *E05B 81/20* (2013.01); *B60J 5/101* (2013.01); *E05B 81/06* (2013.01); *E05B 81/14* (2013.01);
(Continued)

(58) Field of Classification Search
CPC .......... E05B 81/20; E05B 81/06; E05B 81/14; E05B 81/18; E05B 81/28; E05B 81/30;
(Continued)

(56) References Cited

U.S. PATENT DOCUMENTS

| 4,927,204 | A | * | 5/1990 | Asada | ..................... E05B 81/20 292/216 |
| 4,969,672 | A | * | 11/1990 | Childs | ..................... E05B 81/14 292/201 |

(Continued)

FOREIGN PATENT DOCUMENTS

| DE | 102016124781 A1 * | 6/2018 | ............. E05B 81/20 |
| DE | 102018124841 A1 * | 4/2020 | ............. E05B 81/20 |

(Continued)

OTHER PUBLICATIONS

Computer Generated Translation for DE102016124781, Generated on Sep. 15, 2021, https://worldwide.espacenet.com/ (Year: 2021).*

*Primary Examiner* — Alyson M Merlino
(74) *Attorney, Agent, or Firm* — Lempia Summerfield Katz LLC

(57) ABSTRACT

A latch assembly for opening and closing a vehicle luggage room may include: a base installed on an end portion of an opening and closing member to open and close a vehicle luggage room; a power conversion member to convert the rotational force of a drive motor into a linear motion; a claw to grip and restrain the striker when the opening and closing member is closed; a pawl to inhibit the rotation of the claw so that the claw maintains a state of having the striker restrained; an error lever installed to rotate with the pawl and configured to rotate so that the pawl is separated from the claw; and a link member to rotate the claw so that the claw grips the striker, when the power conversion member makes the linear motion.

14 Claims, 19 Drawing Sheets

(51) Int. Cl.
*E05B 81/14* (2014.01)
*E05B 81/66* (2014.01)
*E05B 85/24* (2014.01)
*E05B 83/18* (2014.01)
*E05B 81/34* (2014.01)
*E05B 81/40* (2014.01)
*B60J 5/10* (2006.01)
*E05B 85/04* (2014.01)

(52) U.S. Cl.
CPC .............. *E05B 81/34* (2013.01); *E05B 81/40* (2013.01); *E05B 81/66* (2013.01); *E05B 83/18* (2013.01); *E05B 85/24* (2013.01); *E05B 85/045* (2013.01); *E05Y 2201/434* (2013.01); *E05Y 2201/70* (2013.01); *E05Y 2201/702* (2013.01); *E05Y 2900/54* (2013.01)

(58) Field of Classification Search
CPC .......... E05B 81/34; E05B 81/40; E05B 81/66; E05B 83/18; E05B 85/24; E05B 85/243; E05B 85/26; E05B 85/20; Y10T 292/1047; Y10T 292/1082; Y10S 292/23; Y10S 292/43
See application file for complete search history.

(56) References Cited

U.S. PATENT DOCUMENTS

| | | | |
|---|---|---|---|
| 10,914,102 B2* | 2/2021 | Hunt | E05B 81/40 |
| 10,920,464 B2* | 2/2021 | Im | E05B 81/20 |
| 2018/0171680 A1* | 6/2018 | Hunt | E05B 81/20 |

FOREIGN PATENT DOCUMENTS

| | | | | |
|---|---|---|---|---|
| DE | 102018125639 A1 * | 4/2020 | | E05B 81/20 |
| JP | 2008-013932 A | 1/2008 | | |

* cited by examiner

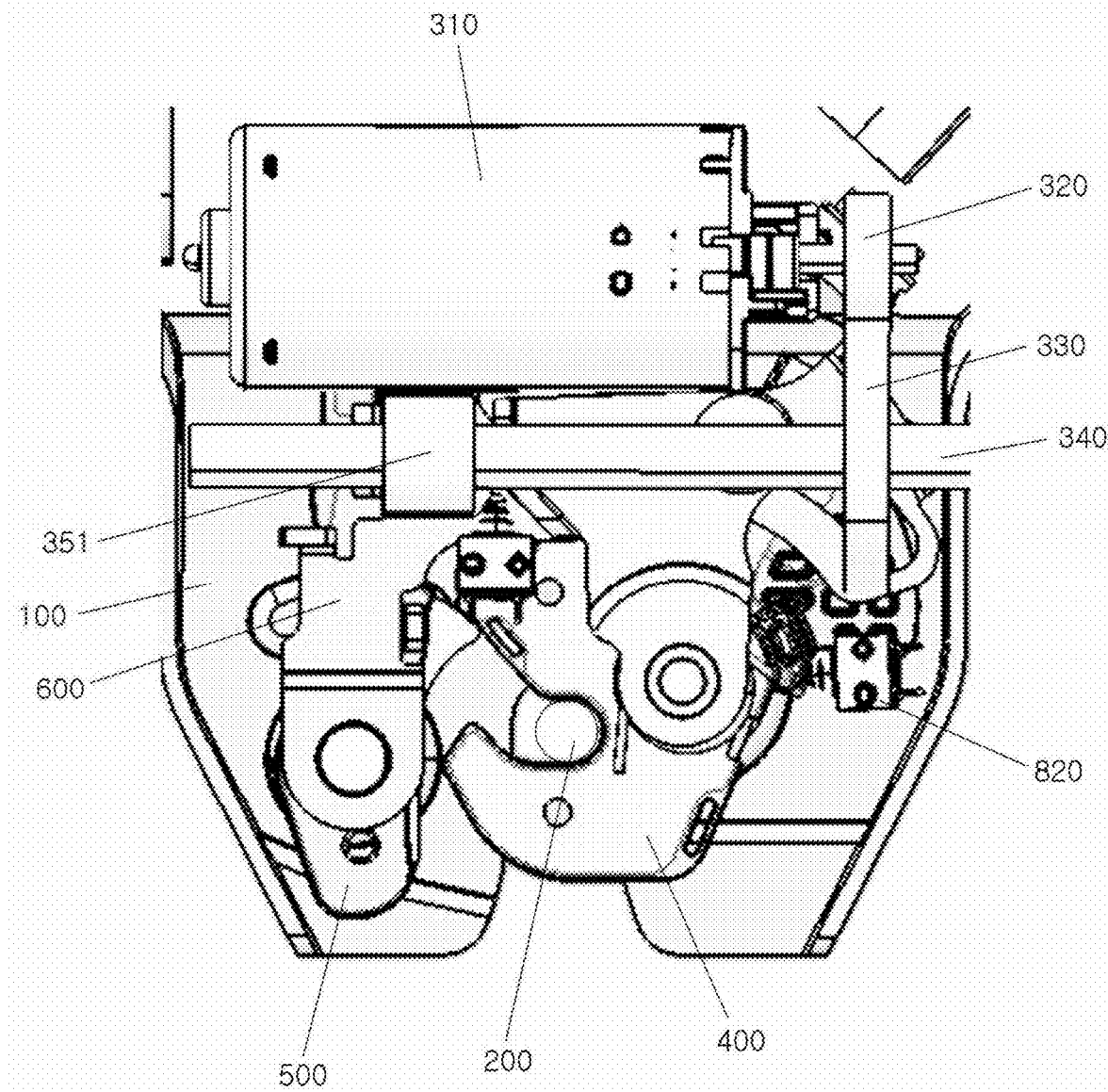

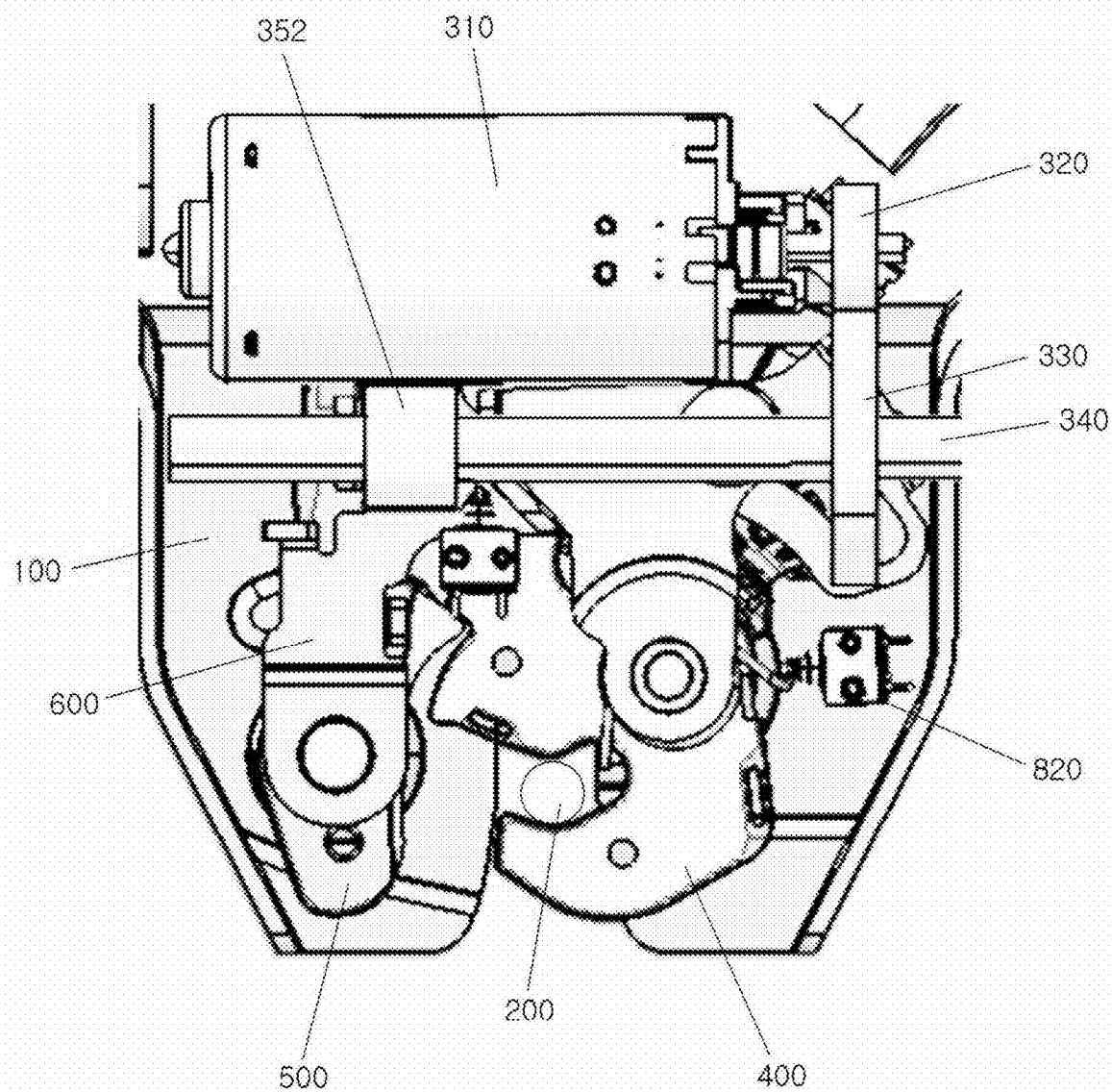

LATCH ASSEMBLY FOR OPENING AND CLOSING LUGGAGE ROOM OF VEHICLE

CROSS-REFERENCE TO RELATED APPLICATION

This application claims priority to and the benefit of Korean Patent Application No. 10-2019-0056315, filed on May 14, 2019, the entire contents of which are incorporated herein by reference.

FIELD

The present disclosure relates to a latch assembly for opening and closing a luggage room of a vehicle.

BACKGROUND

The statements in this section merely provide background information related to the present disclosure and may not constitute prior art.

A trunk of a sedan type vehicle is opened and closed through a trunk lid, and the rear of a vehicle such as a Sport Utility Vehicle (SUV) or a van is opened and closed through a tailgate. The trunk lid and the tailgate are disposed at the rear of the vehicle to close a space for loading a cargo (hereinafter referred to as a luggage room), and a latch assembly fastened to a striker installed in the vehicle is provided on the trunk lid and the tailgate.

The latch assembly operates a pawl for restraining or releasing a claw for which a drive motor grips the striker, thereby cinching or releasing the latch assembly.

A plurality of gears such as a worm gear and a worm wheel are installed between the drive motor and the pawl, and the drive motor has a structure exposed to the outside of the latch assembly in order to install the gears.

We have discovered that power transmission efficiency is reduced due to an increased number of gears installed between the drive motor and the pawl and an increased number of components accordingly.

In addition, we have found that since the drive motor is exposed to the outside of the latch assembly, the size of the latch assembly increases.

SUMMARY

The present disclosure provides a latch assembly for opening and closing a luggage room of a vehicle, which reduces the number of gears installed between a drive motor and a pawl, thereby improving the power transfer efficiency.

The present disclosure also provides a latch assembly for opening and closing a luggage room of a vehicle, which installs a drive motor so as not to be protruded to the outside of the latch assembly.

In one form of the present disclosure, a latch assembly for opening and closing a luggage room of a vehicle includes: a base installed on an end portion of an opening and closing member configured to open and close the luggage room of the vehicle, and having a striker fixed to a vehicle body drawn in and out; a power conversion mechanism configured to convert a rotational force of a drive motor into a linear motion; a claw configured to grip and restrain the striker when the opening and closing member is closed; a pawl configured to inhibit rotation of the claw so that the claw maintains a state of having the striker restrained; an error lever installed to rotate with the pawl and configured to rotate so that the pawl is separated from the claw when the power conversion mechanism makes the linear motion; and a link mechanism configured to rotate the claw so that the claw grips the striker, when the power conversion mechanism makes the linear motion in an opposite direction.

In one form, the link mechanism includes: a first link having a first end rotatably installed around the rotary shaft of the claw, and a second link having a first end hinge-connected to a second end of the first link.

In another form, the second link has a second end elastically supported toward the inside of the claw, and the second link has a claw restraint pin, which enters the claw to restrain the claw when becoming a half lock state, and installed at the second end of the second link.

The power conversion mechanism includes: a screw shaft configured to be rotated by the drive motor, and a holder screw-coupled to the screw shaft and configured to rotate the error lever while moving along an axial direction of the screw shaft.

In one form, a rotary shaft of the drive motor and the screw shaft are disposed in parallel with each other.

In another form, the holder is formed with a cinching-release pin, which contacts the error lever to push the error lever to be spaced apart from the claw for releasing the striker, and pushes and rotates the first link so that the claw becomes a full lock state where the claw fully restrains the striker from a half lock state of the striker.

The base is formed with a guide member configured to guide the linear motion of the cinching-release pin.

The guide member is a guide plate on which a cinching-release pin guide groove is formed to guide the cinching-release pin.

The guide member is a motor housing fastened to the base, and formed with a slot along the axial direction of the screw shaft so as to guide the cinching-release pin while covering the drive motor.

The error lever is formed with a bent part on which the claw contacts the cinching-release pin for releasing the striker.

The error lever is formed with a claw restraint pin guide groove that accommodates the claw restraint pin and in which the claw restraint pin is disposed outside the claw or contacts the claw to rotate the claw.

The first link is formed with a contact part, and the cinching-release pin pushes the contact part to rotate the first link, such that the striker becomes a full lock state from a half lock state.

The claw is formed with an operating surface contacting the claw restraint pin, when the claw restraint pin rotates the claw so as to be the full lock state from the half lock state.

When the claw becomes an off state where the striker is separated from the claw through the half lock state from the full lock state, or the claw becomes the full lock state through the half lock state from the off state, the drive motor moves the cinching-release pin to its original position.

The end portion of the pawl spaced apart from the claw is formed with a locking part formed to be bent, the outside end portion of the error lever is formed with an operating part contacting the locking part when the error lever rotates outwards from the base, the operating part pushes the locking part to rotate the pawl at the time of releasing the striker from the claw, and the locking part pushes the operating part to rotate the error lever when the claw full locks the striker.

The drive motor is fixed inside the base, and the drive motor and the power conversion mechanism are engaged with a portion adjacent to the end portion of the base.

The base is provided with at least one switch configured to sense the rotating state of the claw.

According to the latch assembly for opening and closing the luggage room of the vehicle of the present disclosure having the above configuration, it is possible to reduce the number of gears and links installed between the drive motor and the pawl, thereby reducing the number of components and reducing the size thereof.

In addition, it is possible to dispose the motor inside the base without being protruded to the outside of the base, thereby reducing the size thereof.

In addition, it is possible to improve the power transmission efficiency by the spindle configured to convert the rotational motion into the linear motion, and increasing the reliability of the cinching and releasing operations.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 10A to 10C are schematic diagrams showing a state where a latch assembly for opening and closing a luggage room of a vehicle according to one form of the present disclosure is open from the closed state;

Figure 11A:
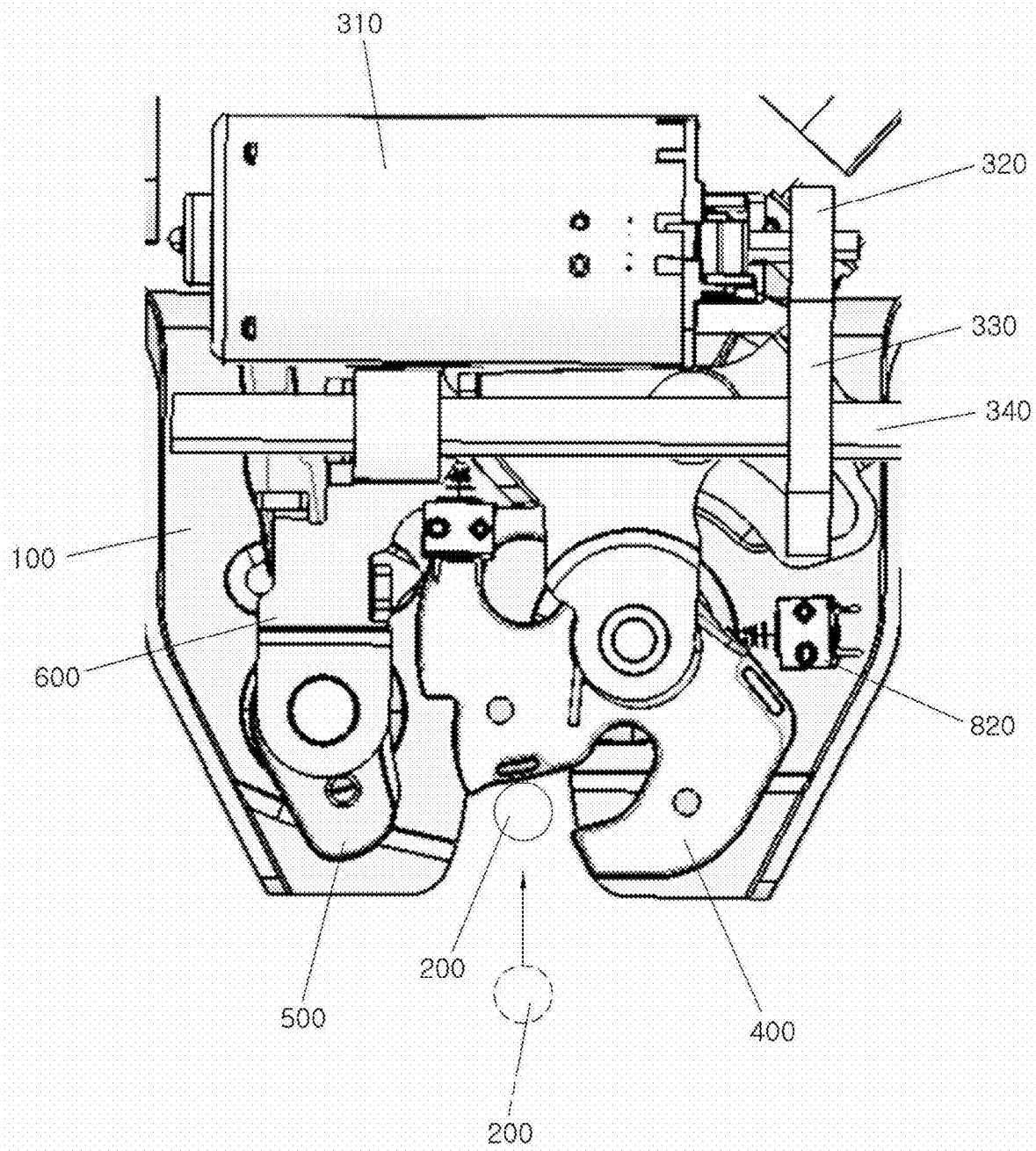
Figure 11C:
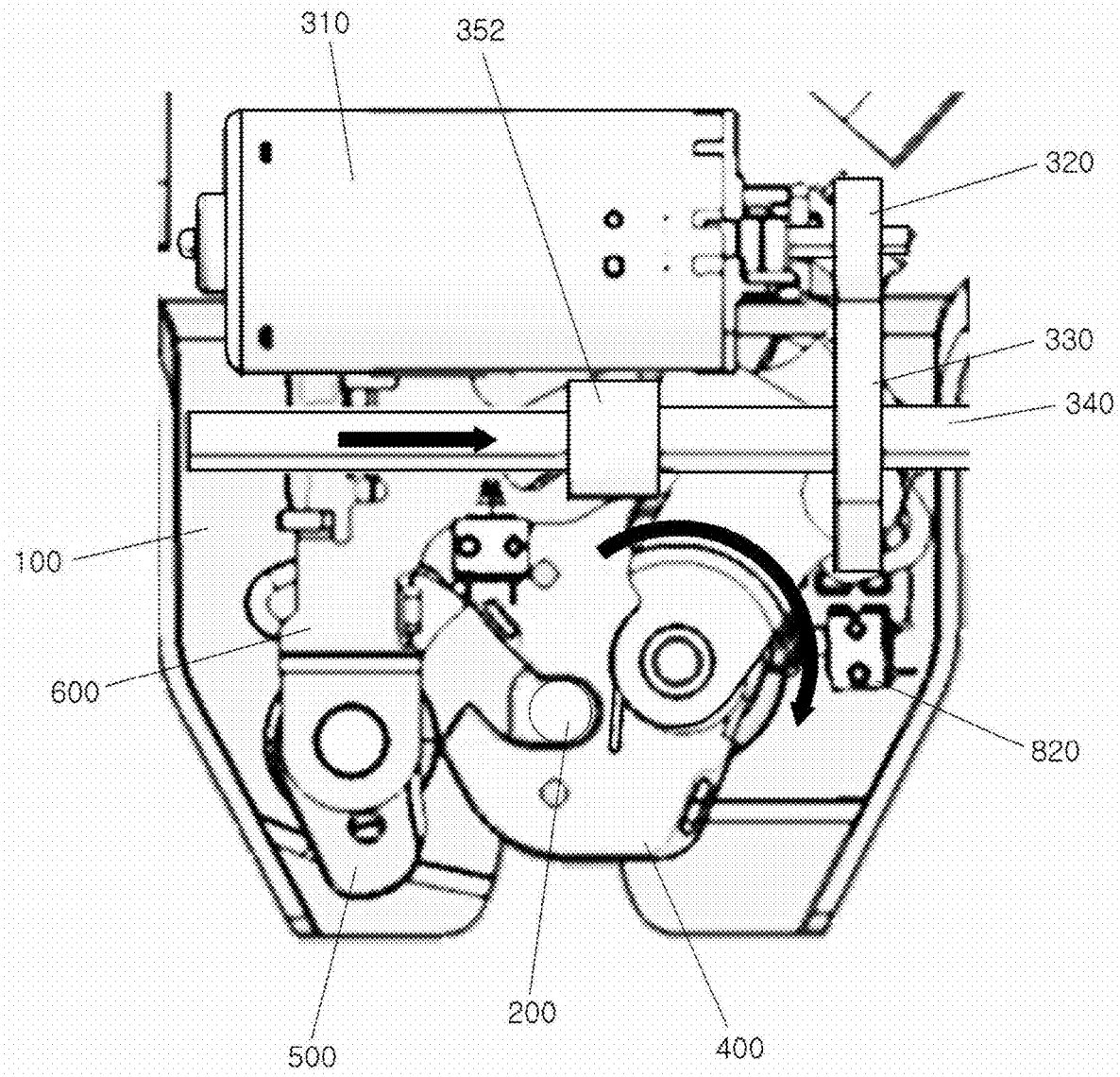
Figure 11D:
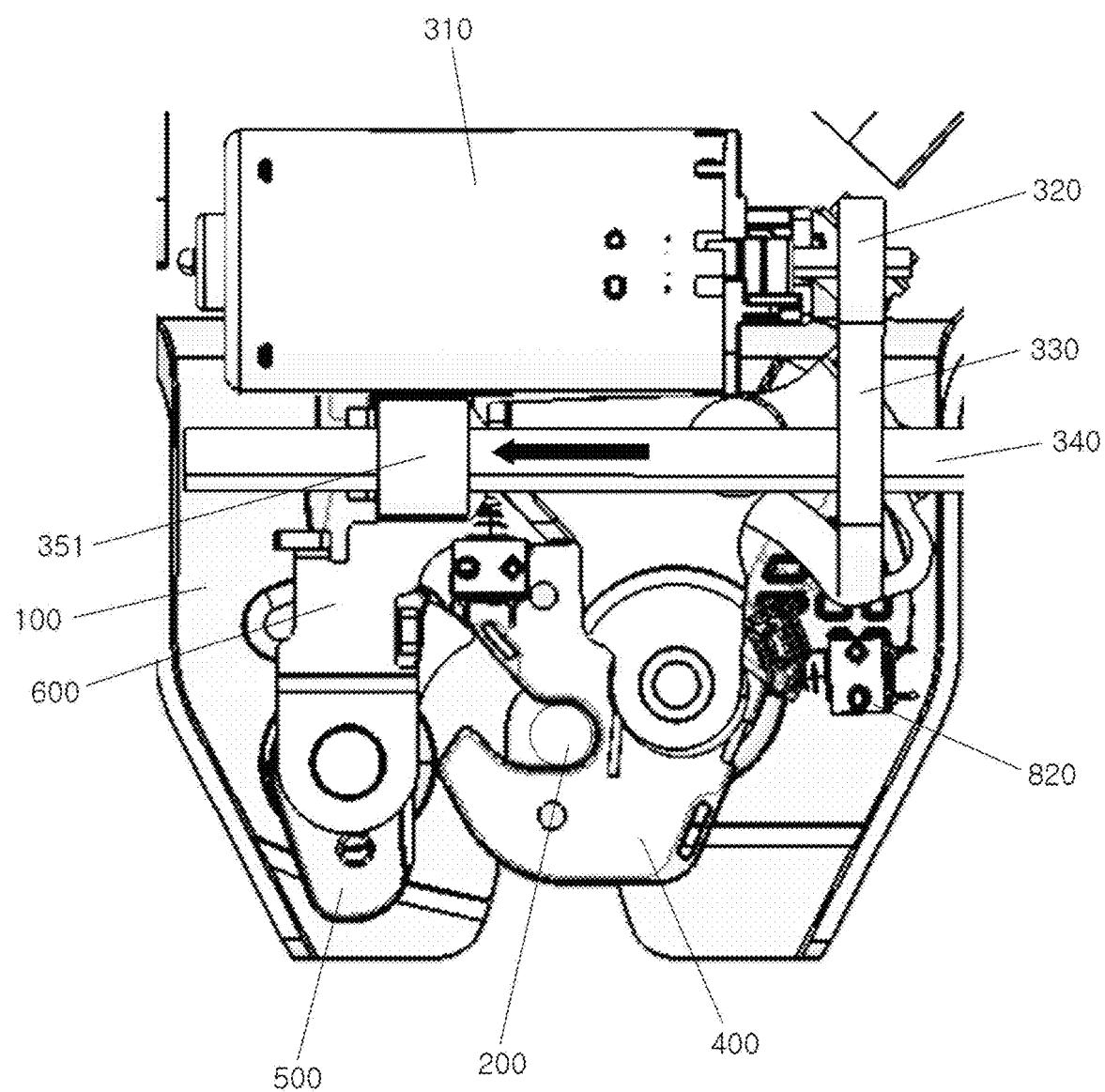
Figure 12A:
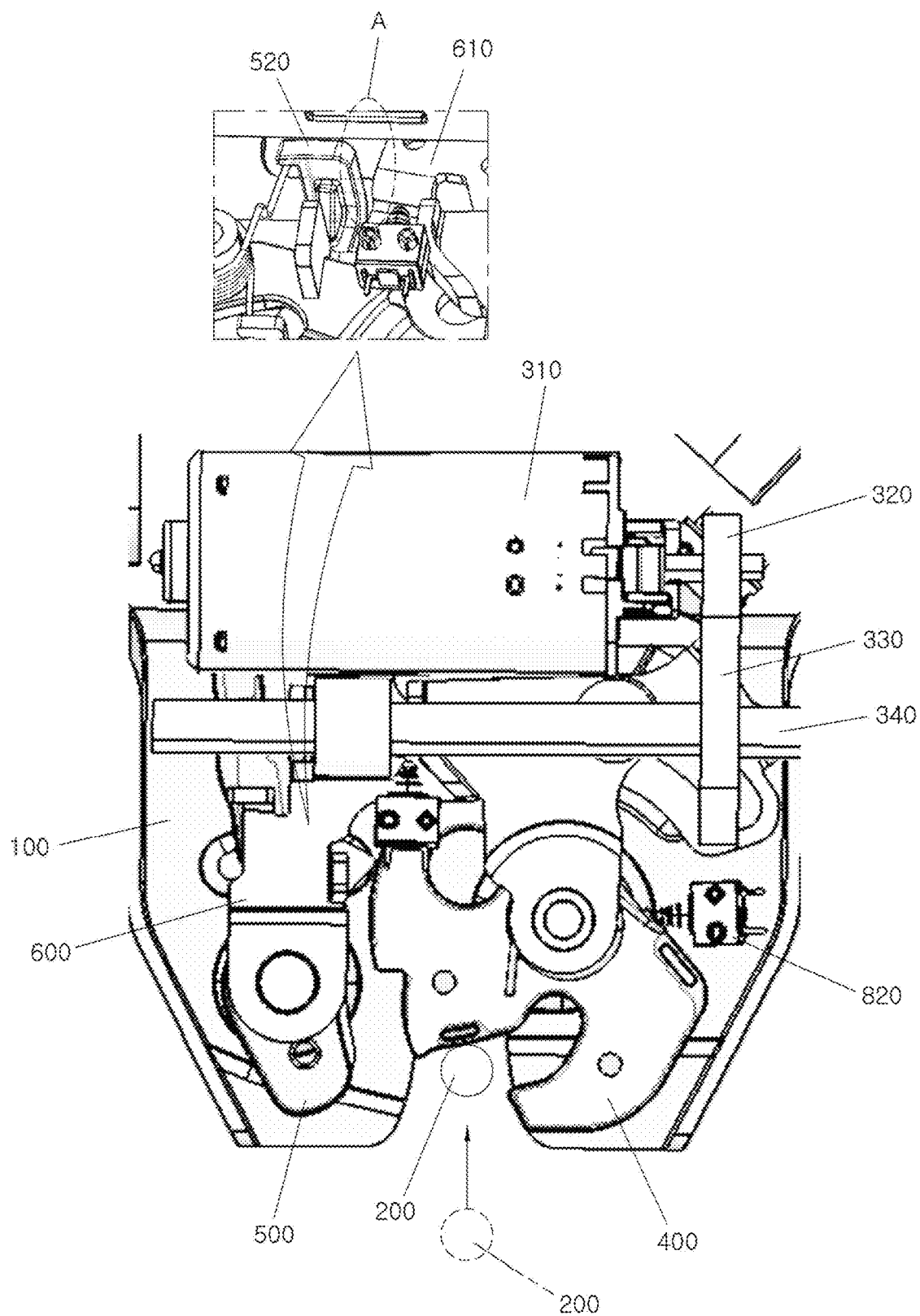
Figure 12B:
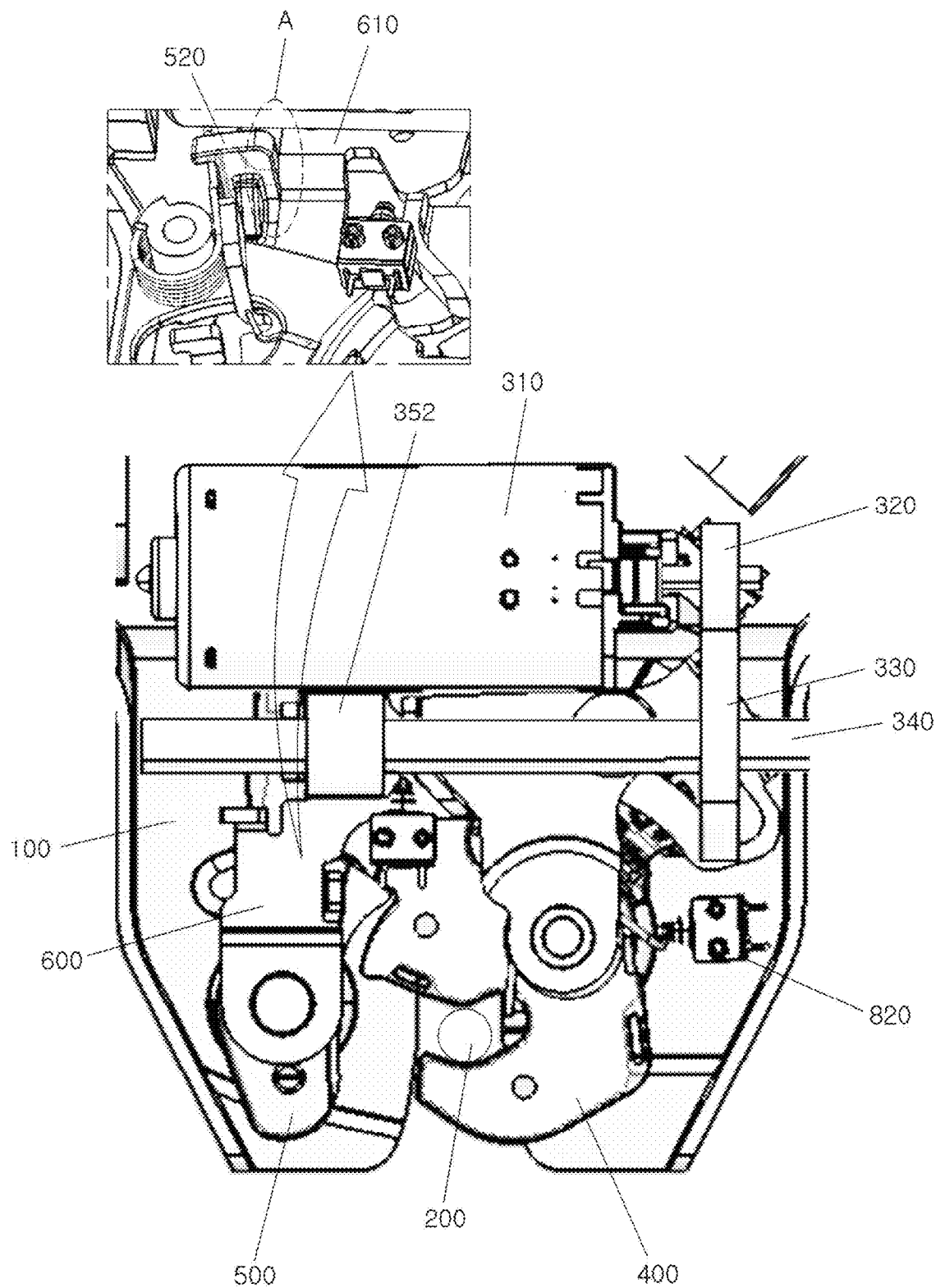
Figure 12C:
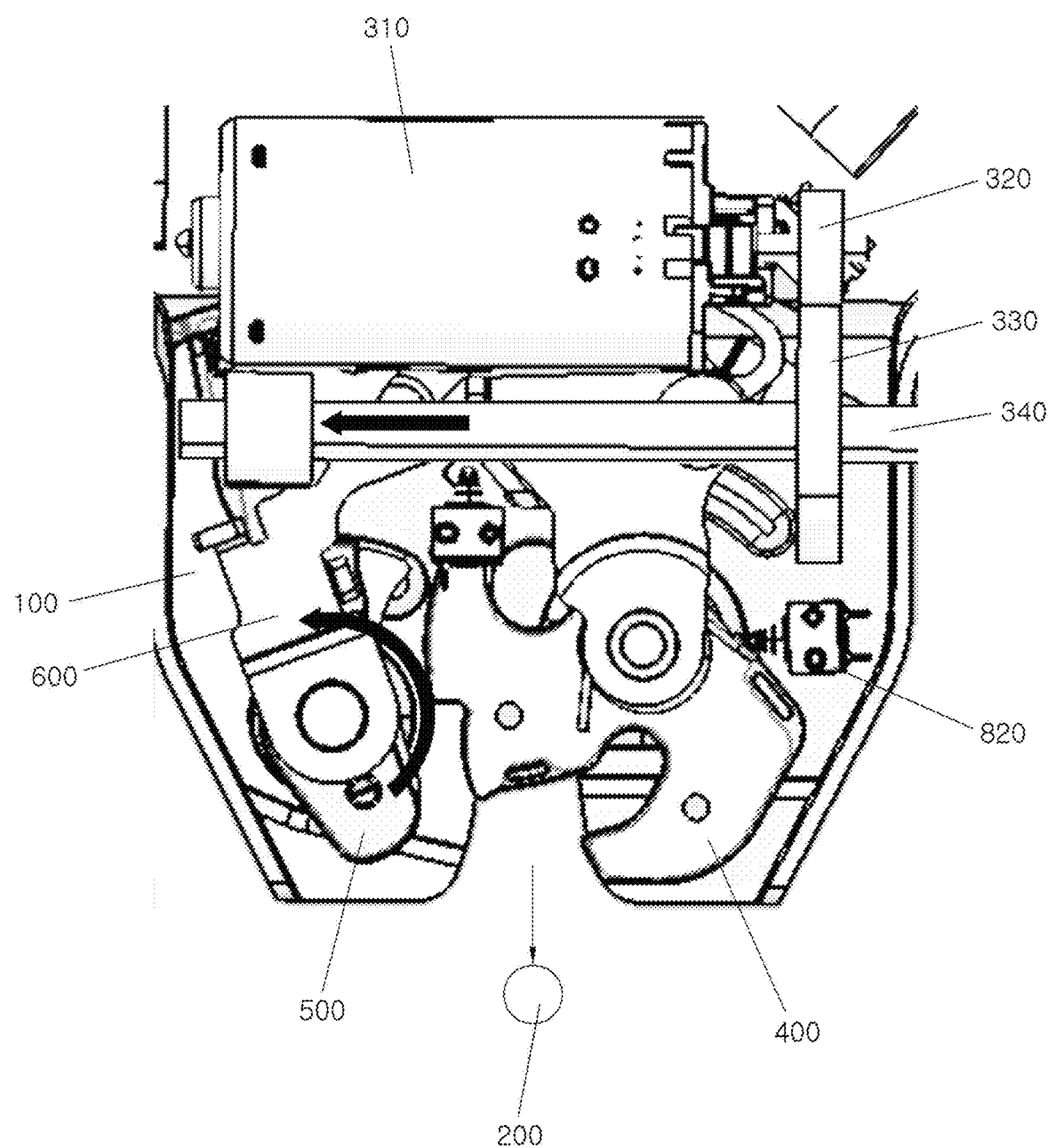

FIGS. 11A to 11D are schematic diagrams showing a state where a latch assembly for opening and closing a luggage room of a vehicle according to one form of the present disclosure is half locked and then full locked from the open state; and FIGS. 12A to 12C are schematic diagrams showing a state where a latch assembly for opening and closing a luggage room of a vehicle according to one form of the present disclosure is interrupted during closing.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a latch assembly for opening and closing a luggage room of a vehicle according to exemplary forms of the present disclosure will be described in detail with reference to the accompanying drawings.

In one form, a latch assembly for opening and closing a luggage room of a vehicle includes: a base 100 installed on the end portion of an opening and closing member configured to open and close a luggage room of a vehicle, and having a striker 200 fixed to a vehicle body drawn in and out, a power conversion mechanism configured to convert the rotational force of a drive motor 310 into a linear motion, a claw 400 configured to grip and restrict the striker 200 when the opening and closing member is closed, a pawl 500 configured to prevent the rotation of the claw 400 so that the claw 400 maintains a state having restricted the striker 200, an error lever 600 configured to rotate so that the pawl 500 is separated from the claw 400 when the power conversion mechanism makes the linear motion, and a link mechanism configured to rotate the claw 400 so that the claw 400 grips the striker 200, when the power conversion mechanism makes the linear motion in an opposite direction to when the claw 400 is separated.

Here, the opening and closing member may be a trunk lid in a sedan type vehicle, and a tailgate in a Sport Utility Vehicle (SUV), a van, or the like.

In particular, the present disclosure may be applied to a case where the trunk lid or the tailgate is automatically opened and closed by the electric motor. In the case of manually opening and closing (particularly, closing), since the striker is completely restrained by the claw, the latch assembly does not require the cinching process of operating to be full locked from the half lock by the weight of the trunk lid or the tailgate. However, since the trunk lid or the tailgate that is electrically opened and closed requires a cinching process of rotating the claw to be full locked from the half lock immediately before the closing is completed, the latch assembly of the present disclosure can be applied to the trunk lid, the tailgate, or the like that is electrically opened and closed.

The base 100 is installed on the end portion of the opening and closing member configured to open and close the luggage room of the vehicle. The base 100 is formed with a drawn in and out groove 101 having the striker 200 fixed to the vehicle body of the vehicle drawn in and out.

The drive motor 310 is fixed to the base 100 to provide power for the operation of the latch assembly. A drive gear 320 is mounted on the rotary shaft of the drive motor 310. The drive motor 310 is fixed to the inside of the base 100, and the drive motor 310 and the power conversion mechanism is engaged in a portion adjacent to the end portion of the base 100.

The power conversion mechanism converts the rotational force of the drive motor 310 into a linear motion so that the latch assembly is in an open, half lock, cinching, or full lock state.

The power conversion mechanism includes a driven gear 330 engaged with the drive gear 320, a screw shaft 340 fastened to the driven gear 330, a holder 351 which is screw-coupled to the screw shaft 340, and a cinching-release pin 352 formed at one side of the holder 351 to allow the striker 200 to be restrained or released by the claw 400.

The screw shaft 340 is formed in parallel with the rotary shaft of the drive motor 310, and has a thread formed on the outside. The screw shaft 340 is disposed in the width direction of the base 100.

The holder 351 is screwed to the screw shaft 340. The holder 351 is screw-coupled to the screw shaft 340, such that the rotational motion of the screw shaft 340 is converted into the linear motion of the holder 351.

The cinching-release pin 352 is formed on the outside of the holder 351 to be protruded in the radius direction of the holder 351. The cinching-release pin 352 pushes and rotates the error lever 600 to be described later to be spaced apart from the claw 400 when releasing the restraint of the striker 200, and rotates a first link 710 to be described later to be full locked from the half lock when restraining the striker 200.

A guide member is provided to guide the cinching-release pin 352 so that the cinching-release pin 352 makes the linear motion along the axial direction of the screw shaft 340.

Figure 4:
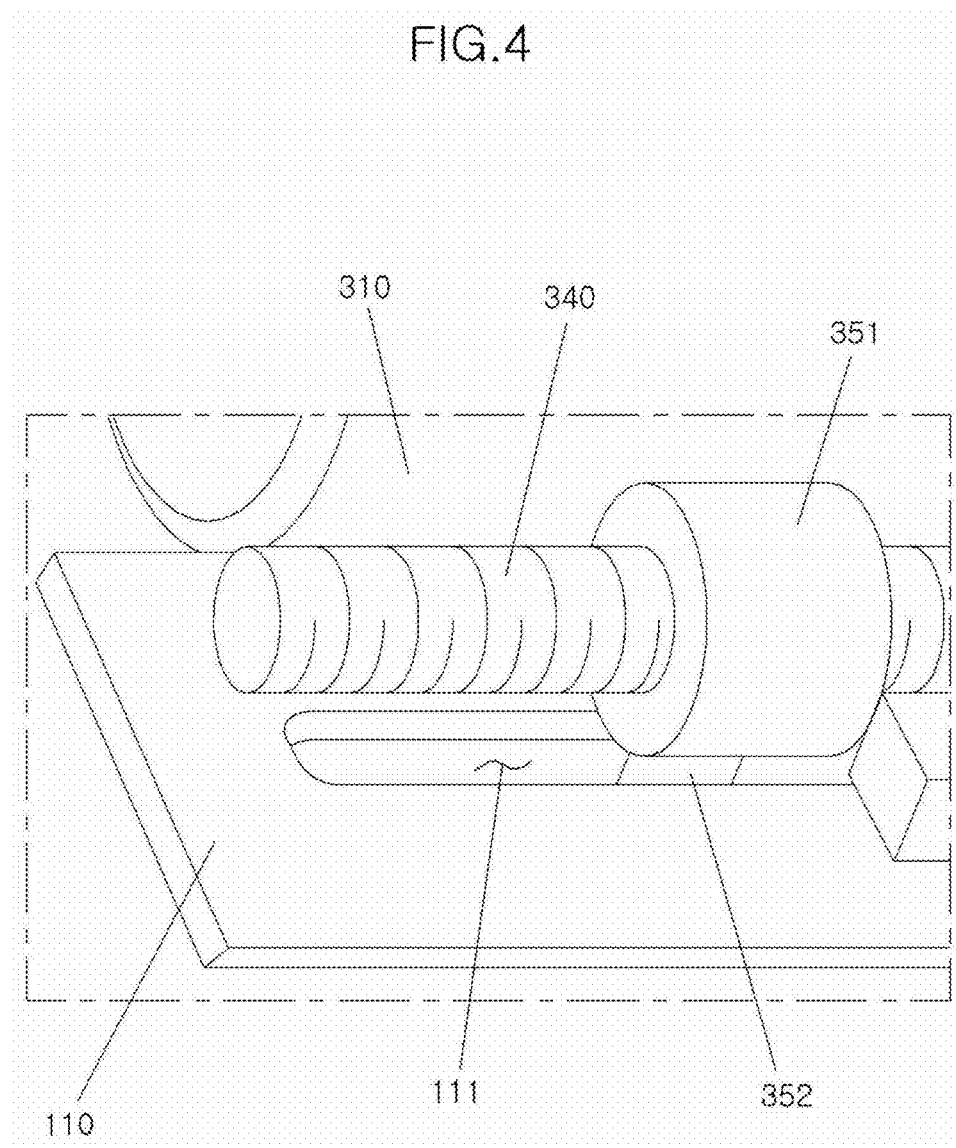
FIG. 4 is a perspective diagram showing an example of guiding cinching-releasing pin by using a guide plate in a latch assembly for opening and closing a luggage room of a vehicle according to one form of the present disclosure.

For example, as shown in FIG. 4, the guide member is formed with a cinching-release pin guide groove 111 along the longitudinal direction of the screw shaft 340, and may be a guide plate 110 fastened to the base 100.

Figure 5:
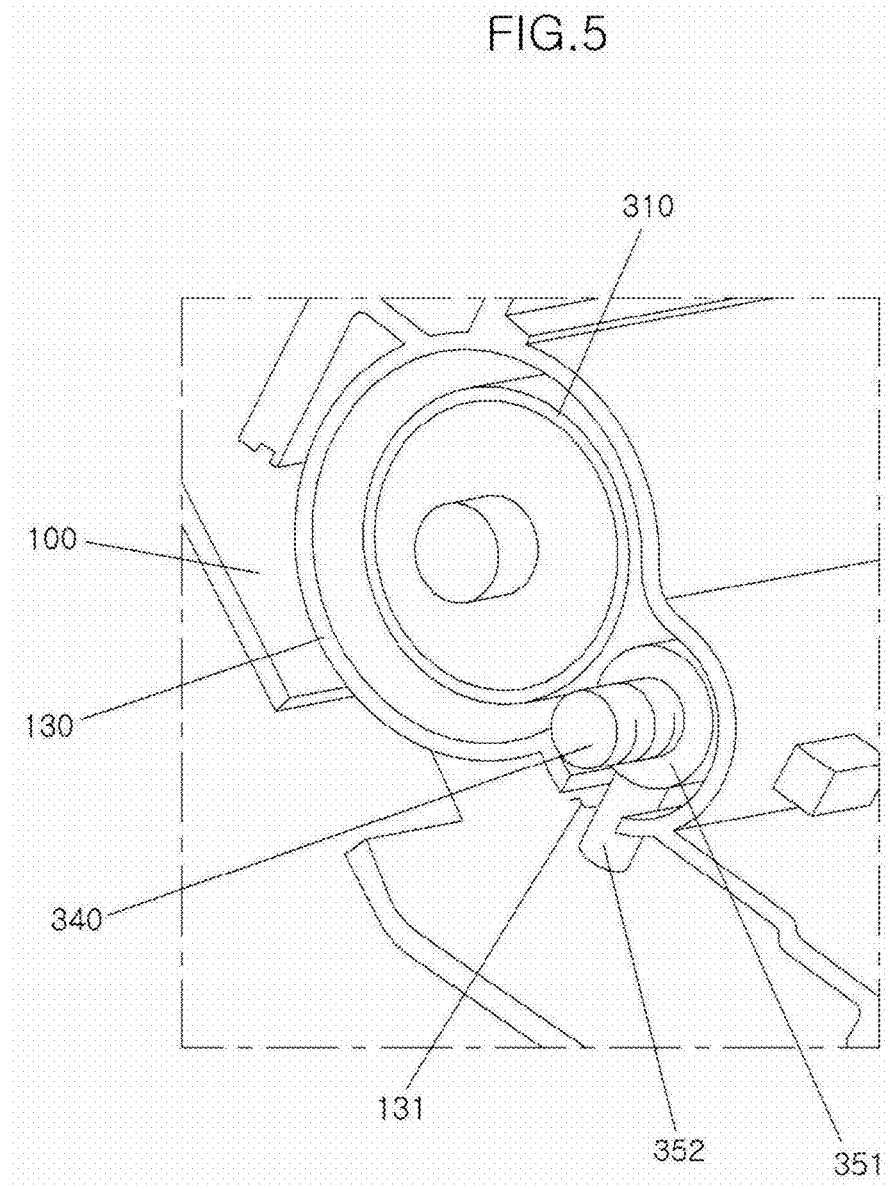
FIG. 5 is a perspective diagram showing an example of guiding a cinching-releasing pin by using a motor housing in a latch assembly for opening and closing a luggage room of a vehicle according to one form of the present disclosure.
Figure 6:
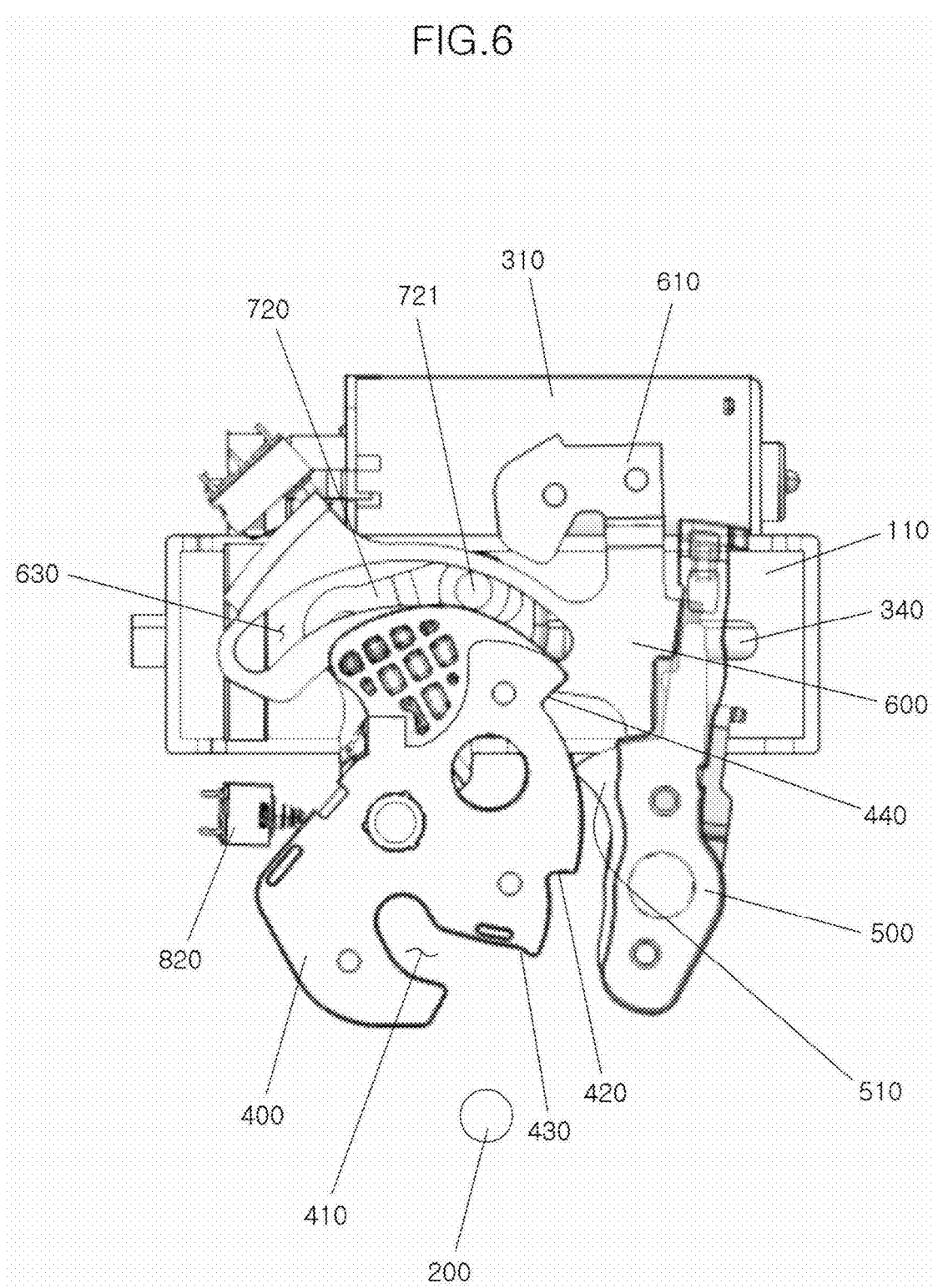
FIG. 6 is an enlarged diagram of a main portion showing a state where a latch assembly for opening and closing a luggage room of a vehicle according to one form of the present disclosure has been open.
Figure 7:
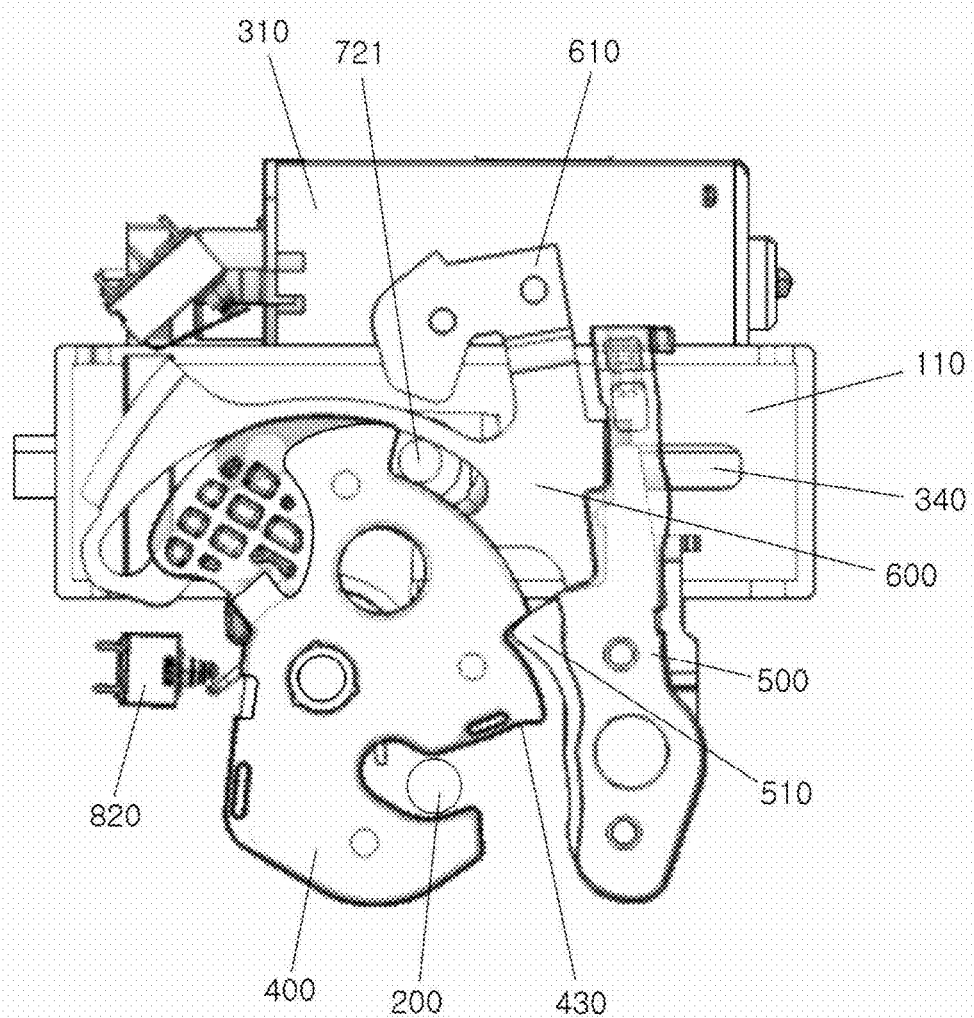
FIG. 7 is an enlarged diagram of a main portion showing a state where a latch assembly for opening and closing a luggage room of a vehicle according to one form of the present disclosure has been a half locked.
Figure 8:
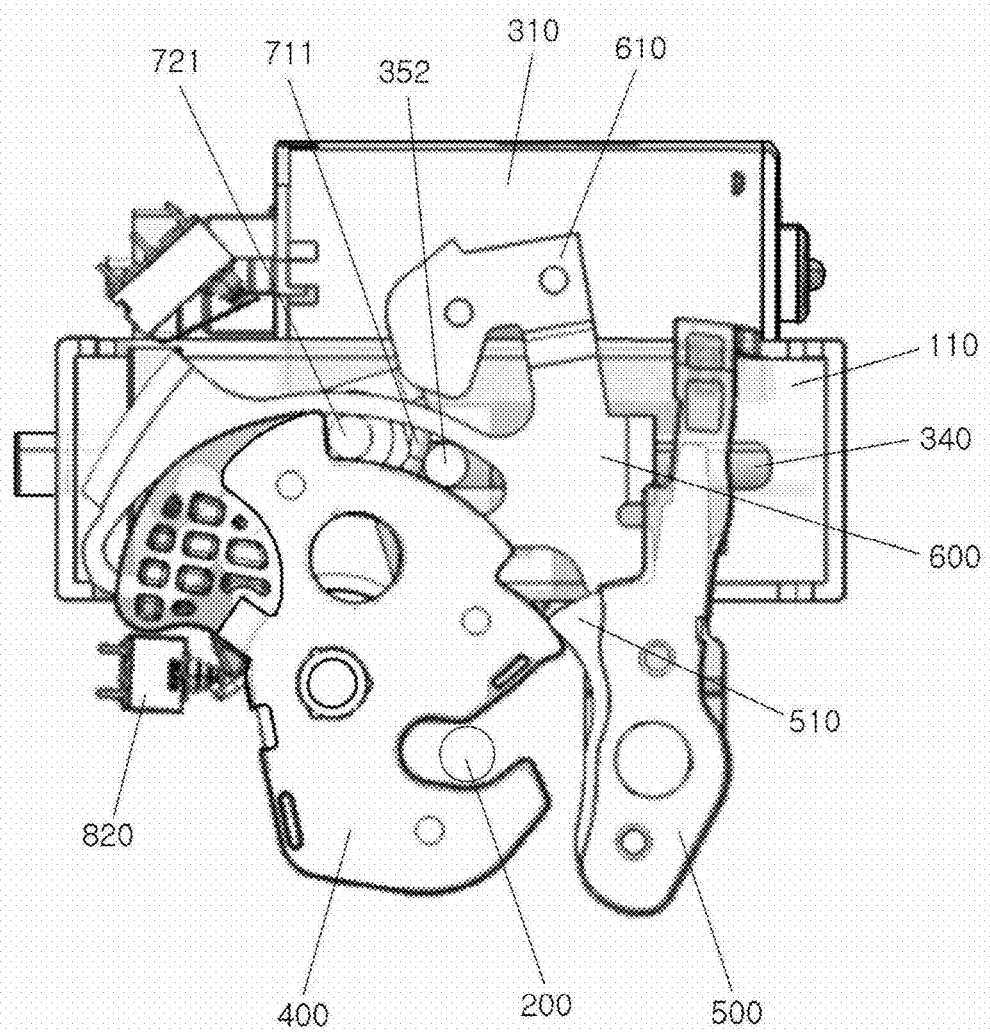
FIG. 8 is an enlarged diagram of a main portion showing a state where a latch assembly for opening and closing a luggage room of a vehicle according to one form of the present disclosure has been cinching.
Figure 9:
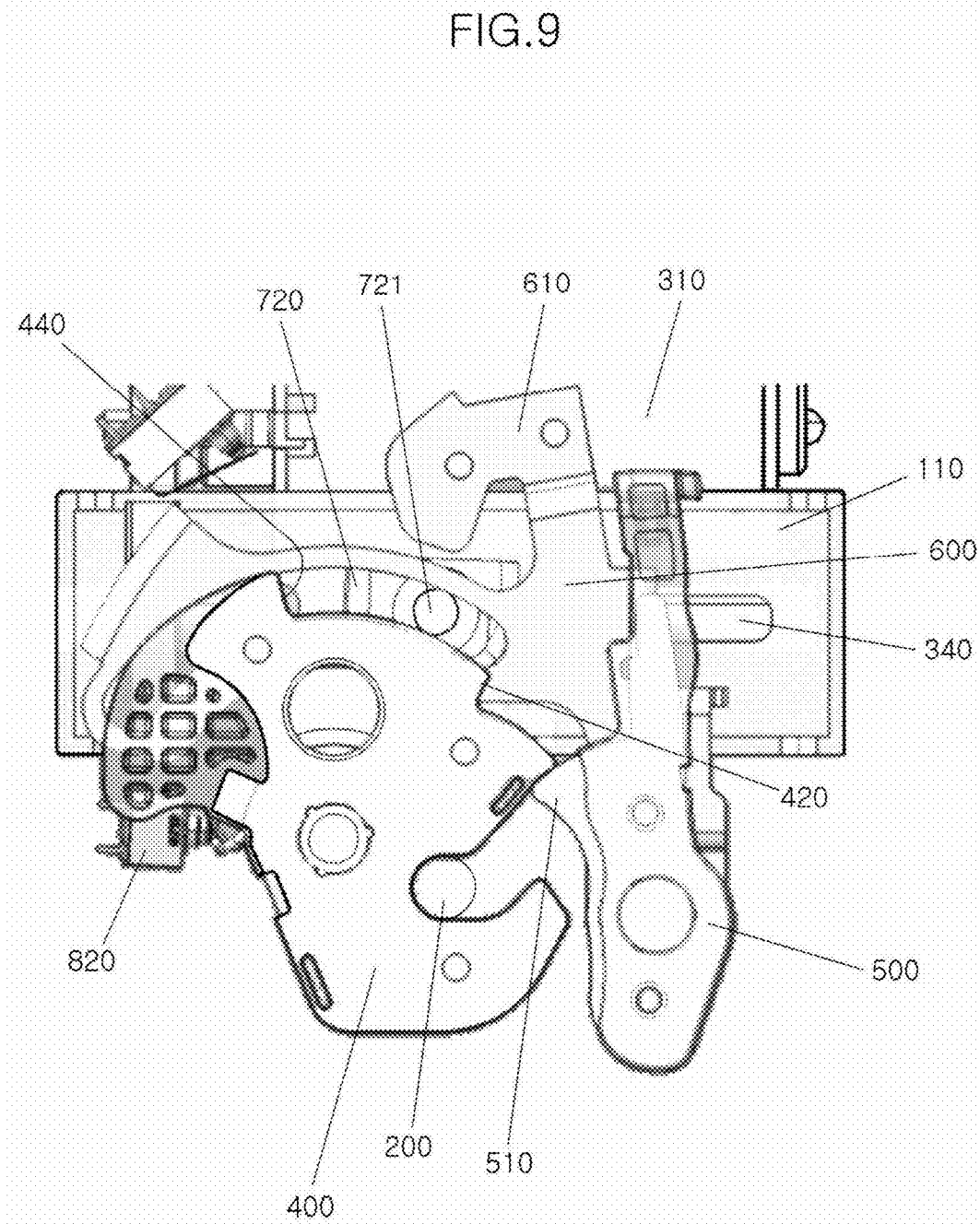
FIG. 9 is an enlarged diagram of a main portion showing a state where a latch assembly for opening and closing a luggage room of a vehicle according to one form of the present disclosure has been full locked.

Alternatively, the guide member may also be formed so that a slot 131 is formed along the axial direction of the screw shaft 340 in the latch assembly coupled to the base 100 or a motor housing 130 covering the drive motor 310 (see FIG. 5).

The cinching-release pin 352 guides the linear motion by the cinching-release pin guide groove 111 or the slot 131.

The claw 400 is rotatably installed on the base 100, and a gripping groove 410 is formed to restrain the striker 200.

The gripping groove 410 is intersected with the drawn in and out groove 101 when the striker 200 is restrained to prevent the striker 200 from being separated, and is parallel to the drawn in and out groove 101 when the striker 200 is released so that the striker 200 is separated.

The claw 400 is installed on the base 100 in an elastically supported state, such that when the external force (the restraint force of the pawl) is released, the claw 400 rotates in the direction in which the restraint of the striker 200 is released (the direction in which the gripping groove and the drawn in and out groove are parallel to each other).

A half lock stop surface 420 and a full lock stop surface 430 are formed on the circumference of the claw 400. The full lock stop surface 430 is formed adjacent to the gripping groove 410, and then the half lock stop surface 420 is formed. The half lock stop surface 420 and the full lock stop surface 430 sequentially contact the pawl 500 to be described later, thereby preventing the claw 400 from rotating in a direction of releasing the restraint of the striker 200.

In addition, an operating surface 440 used to rotate the claw 400 at cinching of the claw 400 is formed in a direction opposite to the full lock stop surface 430 from the half lock stop surface 420.

The pawl 500 is rotatably installed on the base 100. The pawl 500 is installed in an elastically supported state so as to rotate in a direction of restraining the claw 400. The pawl 500 has a stopper 510, which contacts the half lock stop surface 420 and the full lock stop surface 430 to prevent rotation of the claw 400, formed at one side thereof.

A locking part 520 formed to be bent on the end portion spaced apart from the claw 400 is formed on the pawl 500. The claw 400 and the locking part 520 are formed in opposite directions to each other.

The error lever 600 is installed on the base 100 to rotate together with the pawl 500, and when the power conversion mechanism makes the linear motion in any one direction (right to left in FIG. 2), the pawl 500 rotates with the pawl 500 to be separated from the claw 400.

An operating part 610, which contacts the locking part 520 of the pawl 500 to rotate together with the pawl 500 when the error lever 600 rotates outwards (direction spaced apart from the claw), is formed on the outside end portion of the error lever 600. Since the operating part 610 is formed in a bent shape, the error lever 600 rotates the pawl 500 when the error lever 600 rotates.

In addition, a cable 650 may be connected to the operating part 610 so that the latch assembly releases the striker 200 by manually rotating the error lever 600. As described above, since the opening and closing member is automatically opened and closed by the electric motor in a normal state, a member for manually operating the latch assembly (for example, an emergency handle) is not necessary. However, the emergency handle should be provided on the opening and closing member so as to enable emergency escape from the luggage room. To satisfy this regulation, the cable 650 is connected with the emergency handle to manually open the latch assembly.

A bent part 620 is formed at one side of the error lever 600, for example, the opposite side of the claw 400. The bent part 620 may be locked by the cinching-release pin 352 to rotate the error lever 600 outwards when the cinching-release pin 352 moves outwards from the base 100.

An arc-shaped claw restriction pin guide groove 630 is formed in the error lever 600.

Figure 1:
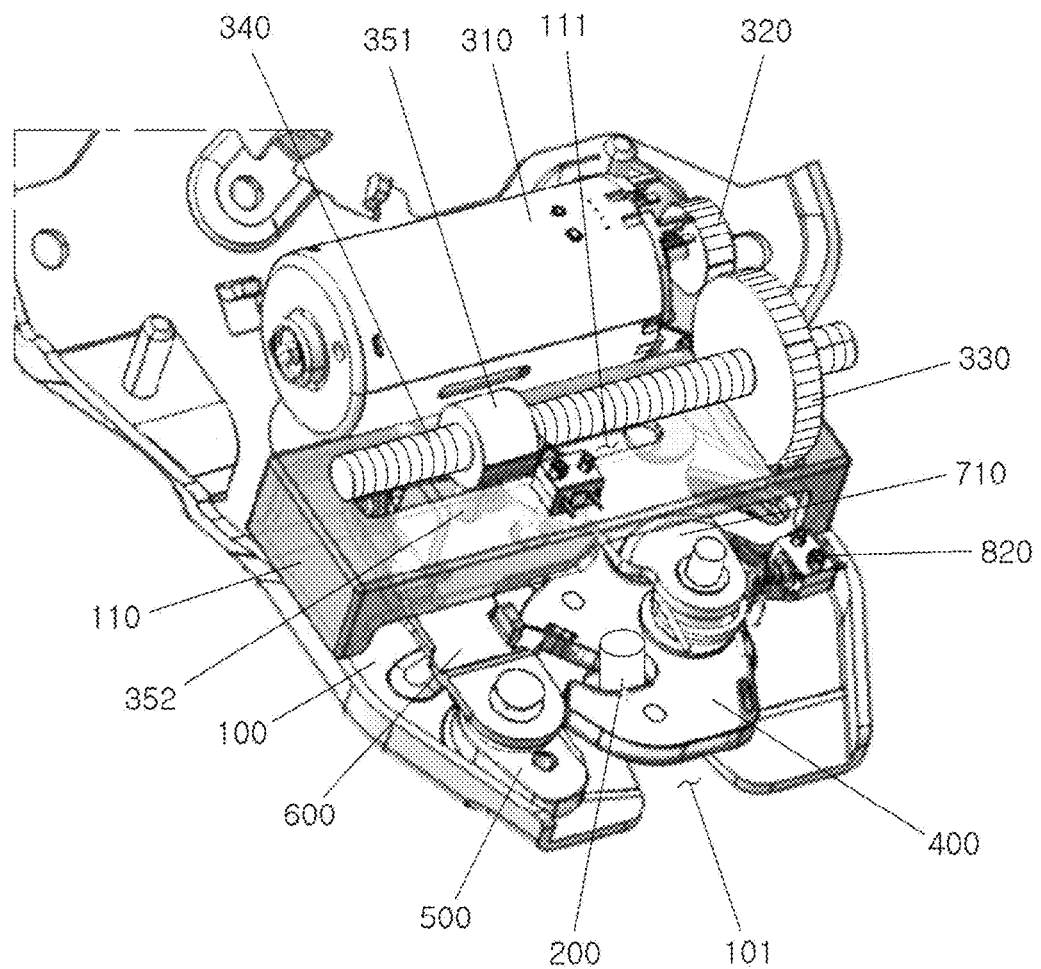
FIG. 1 is a perspective diagram showing a latch assembly for opening and closing a luggage room of a vehicle according to one form of the present disclosure.
Figure 2:
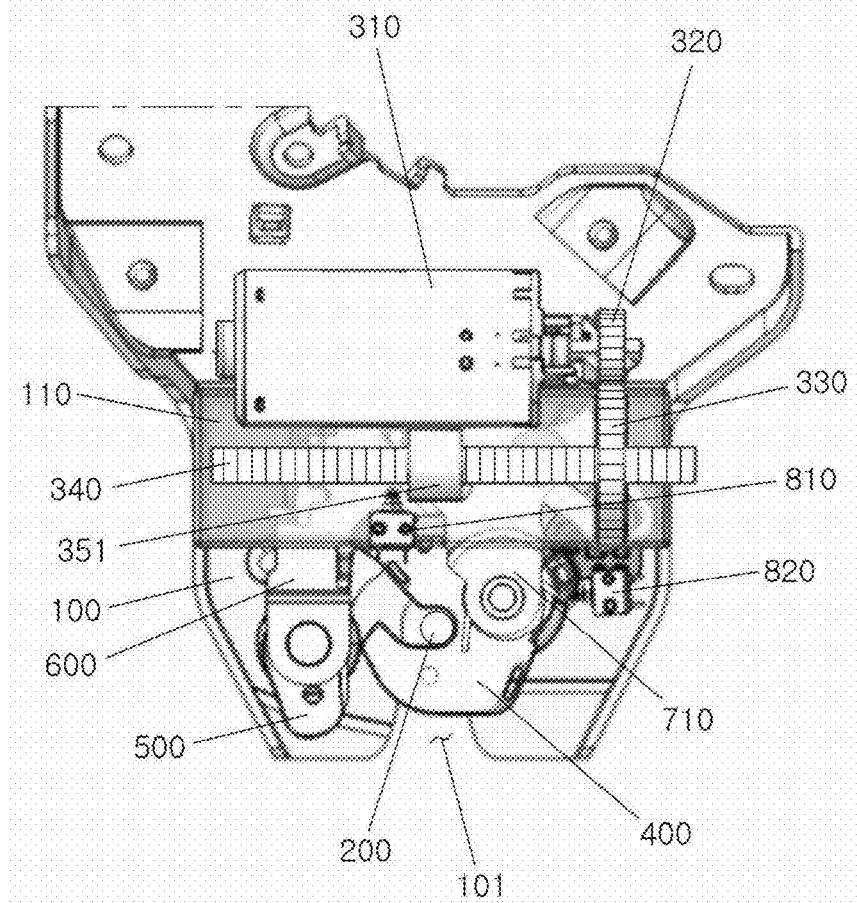
FIG. 2 is a plane diagram showing a latch assembly for opening and closing a luggage room of a vehicle according to one form of the present disclosure.
Figure 3:
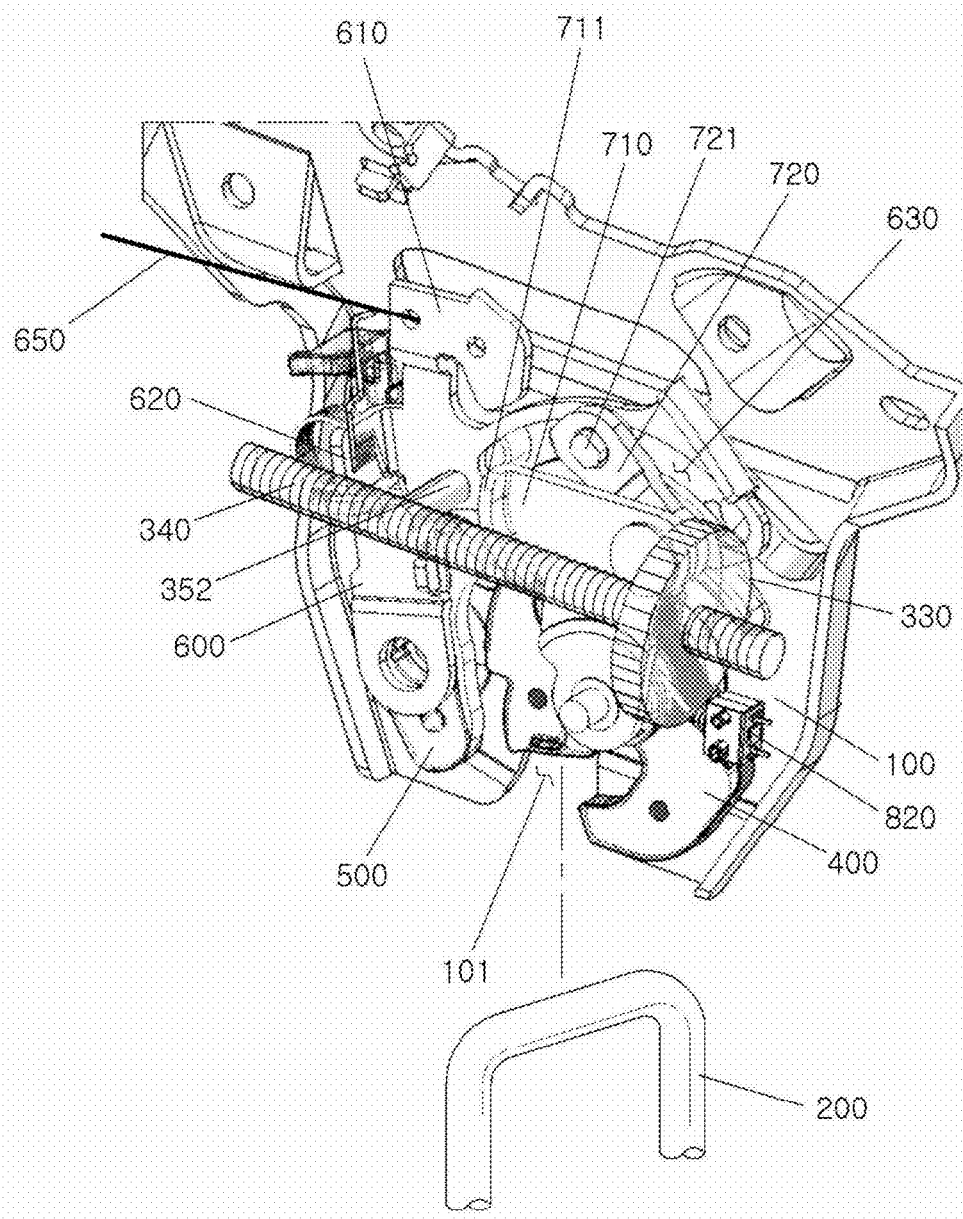
FIG. 3 is a perspective diagram showing a main portion of a latch assembly for opening and closing a luggage room of a vehicle according to one form of the present disclosure.

The link mechanism rotates the claw 400 so that the claw 400 grips the striker 200, when the power conversion mechanism makes the linear motion in order to restrain the claw 400 (from left to right direction in FIG. 2).

To this end, the link mechanism has a first link 710 having one end rotatably installed around the rotary shaft of the claw 400, and has a second link 720 having one end hinge-connected to the other end of the first link 710.

The first link 710 is rotatably installed on the base 100. For example, one end thereof may be installed on the rotary shaft of the claw 400. The first link 710 is rotated by the cinching-release pin 352 when the cinching-release pin 352 makes the linear motion toward the claw 400 (moving from left to right in FIG. 2). One side of the first link 710 is formed with a contact part 711 contacting the cinching-release pin 352. As the cinching-release pin 352 pushes the contact part 711 to rotate the first link 710, the claw 400 is cinched from a half lock state to a full lock state.

The second link 720 has one end hinge-connected to the other end of the first link 710, and has the other end elastically supported to rotate toward the inside of the claw 400. In addition, the other end of the second link 720 is provided with a claw restraint pin 721 configured to rotate the claw 400 to be in a full lock state from a half lock state and at the same time, a portion thereof is accommodated in a claw restraint pin guide groove 630 of the error lever 600.

Accordingly, the other end of the second link 720 moves in the claw restraint pin guide groove 630. That is, the claw restraint pin guide groove 630 accommodates the claw restraint pin 721 so that the claw restraint pin 721 may be disposed outside the claw 400, or may move into the locus of the claw 400 to contact the claw 400 to rotate the claw 400.

The base 100 is provided with at least one switch configured to sense the rotational state of the claw 400. For example, a first switch 810 configured to sense a full lock, a second switch 820 configured to sense a half lock, and a third switch (not shown) configured to sense whether the claw 400 has returned to an initial state after releasing the restraint of the striker 200 may be provided. Any one of the switches may also serve as an ajar function configured to sense the operation of the latch assembly. For example, when a signal is output from the first switch 810 configured to sense the full lock, it is sensed that the closing of the latch assembly has been completed to stop the cinching.

The operation of a latch assembly for opening and closing a luggage room of a vehicle according to the present disclosure having the above configuration will be described as follows.

Figure 10B:
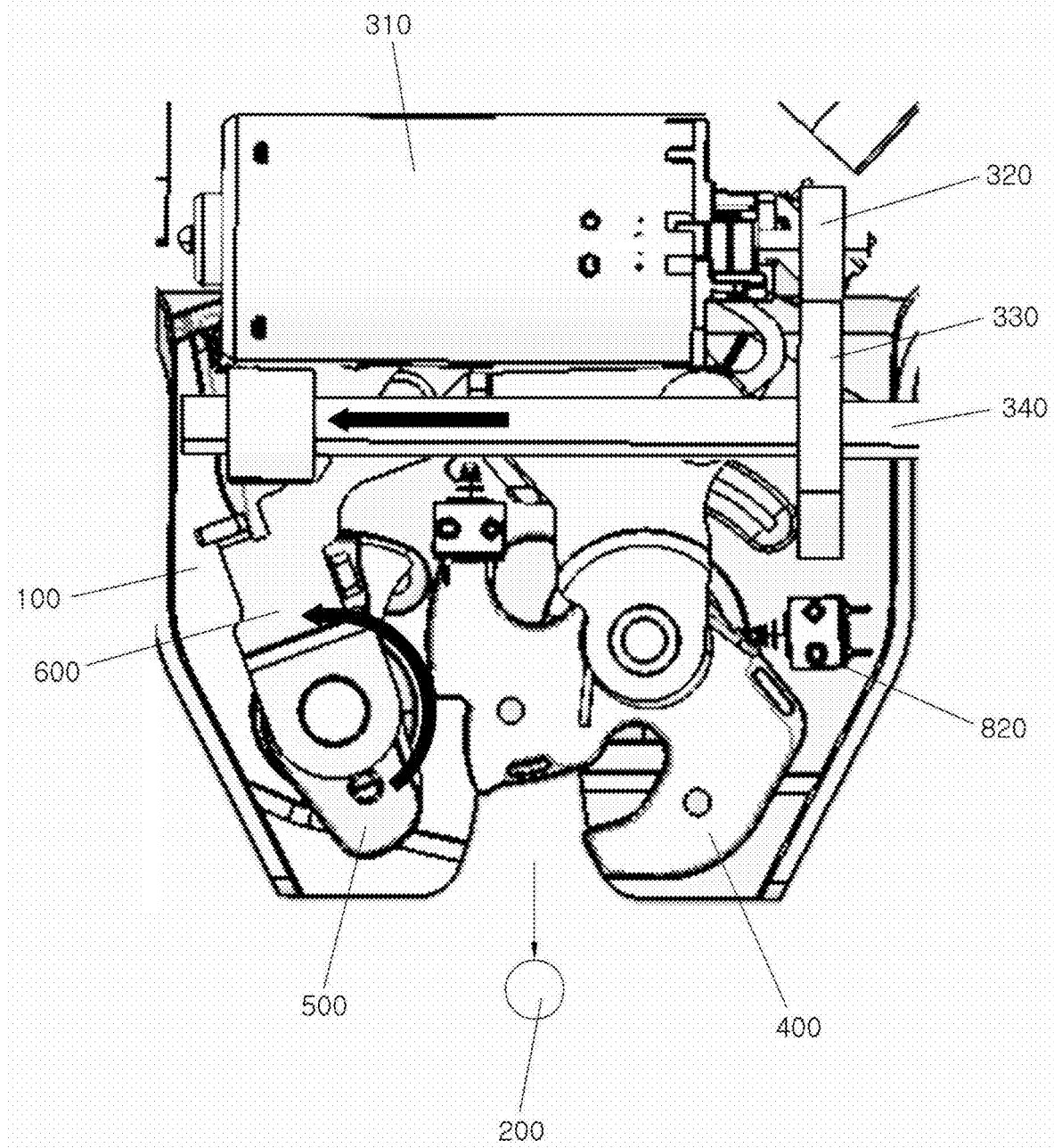
Figure 10C:
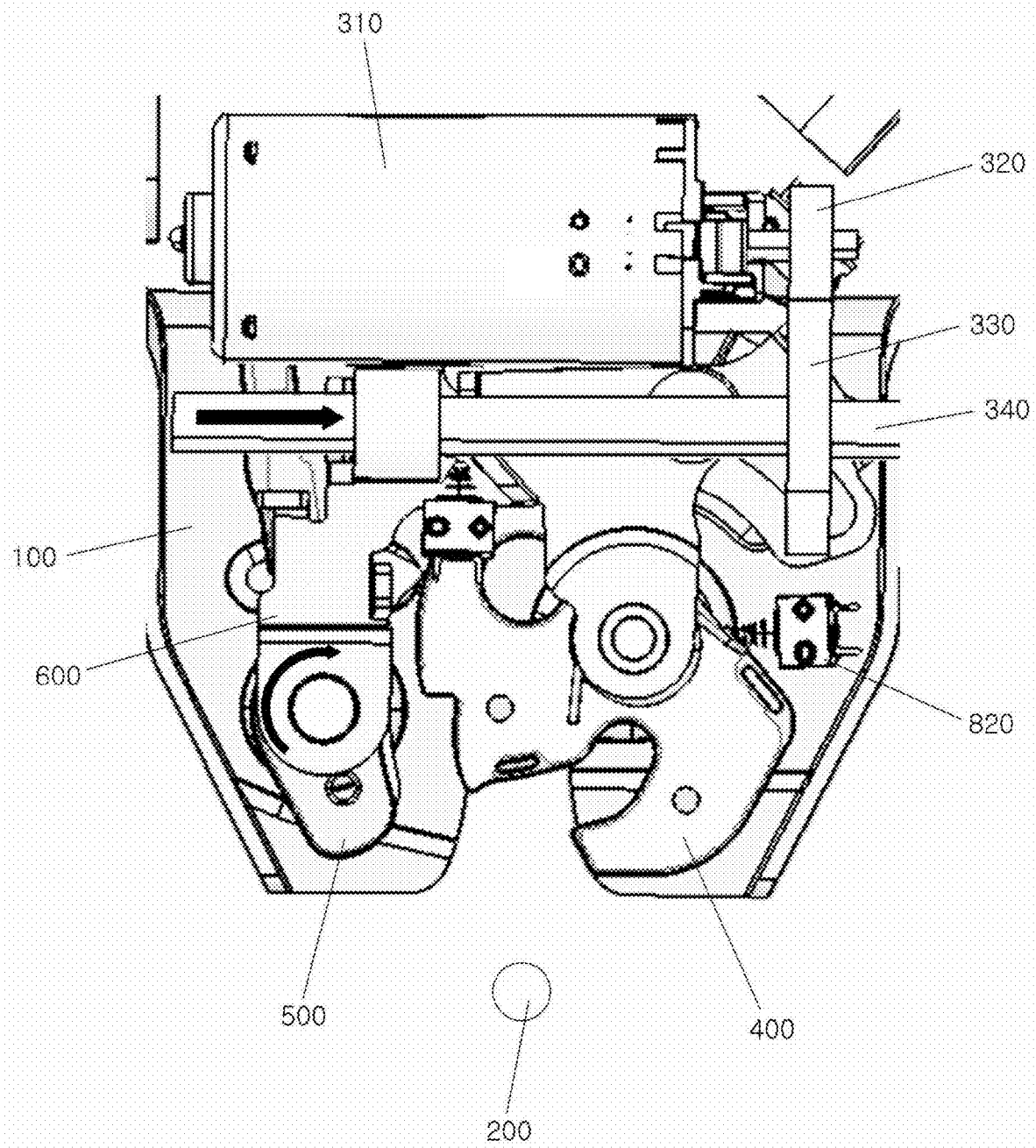

FIGS. 10A to 10C show a state where the claw 400 is opened from the state where the striker 200 has been restrained.

In the state where the opening and closing member such as a trunk lid or a tailgate has been closed (full lock state), the claw 400 restrains the striker 200 so that the opening and closing member is not open (see FIG. 10A).

When the user operates a button in the vehicle interior, or a button in the opening and closing member, the drive motor 310 is rotated to release the striker 200. When the drive motor 310 rotates, the screw shaft 340 is rotated by the rotation of the drive gear 320 and the driven gear 330. When the screw shaft 340 rotates, the holder 351, which is screw-coupled to the screw shaft 340, and the cinching-release pin 352 formed on the holder 351 make the linear motion.

When the restraint of the striker 200 is released, the holder 351 pushes the bent part 620 to the error lever 600 and the pawl 500 while moving outwards (moving from right to left in FIG. 10B). When the pawl 500 rotates in a direction of releasing the claw 400, the pawl 500 may no longer restrain the claw 400. Since the claw 400 is elastically supported to release the restraint of the striker 200, the claw 400 rotates in a direction of releasing the restraint of the striker 200, and accordingly, the striker 200 is released (see FIG. 10B). As described above, when the restraint of the striker 200 is released from the claw 400, the opening and closing member may be opened.

Meanwhile, when it is sensed that the claw 400 has released the striker 200, the drive motor 310 is rotated in an opposite direction to return the holder 351 to its original position (see FIG. 10C). When the holder 351 returns to its original position, the error lever 600 and the pawl 500 also return to their original positions.

FIGS. 11A to 11D show a state where the opening and closing member is closed from an open state.

FIG. 11A is a diagram showing a state where the claw 400 contacts the striker 200.

When the user operates so that the opening and closing member is closed from the state where the restraint of the striker 200 has been released, the claw 400 contacts the striker 200 while the latch assembly is adjacent to the vehicle body.

When the claw 400 contacts the striker 200, the claw 400 and the striker 200 are in a single lock, that is, a half lock state by the inertia of the opening and closing member. The present disclosure is applied to a power trunk, a power tailgate, or the like of the method of opening and closing the opening and closing member by using an electric motor, such that when the opening and closing member is closed, the half lock state where the opening and closing member may not be completely restrained with the power output from the electric motor becomes a two-stage lock, that is, a full lock in which the claw 400 completely restrains the striker 200, through the cinching process.

When the claw 400 contacts the fixed striker 200, the claw 400 rotates in a direction of restraining the striker 200, such that the claw 400 restrains the striker 200 (see FIG. 11B).

At this time, when the claw 400 rotates, the pawl 500 rotates toward the claw 400 by the elastic force so that the stopper 510 of the pawl 500 contacts the half lock stop surface 420 of the claw 400 to maintain the half lock state.

In the half lock state, since the claw 400 has not completely restrained the striker 200, the claw 400 is rotated to be in a state where the claw 400 completely restrains the striker 200 (full lock state). As the drive motor 310 rotates so that the cinching-release pin 352 moves to the inside of the base 100, the cinching-release pin 352 contacts the contact part 711 of the first link 710 and pushes and rotates the first link 710. When the first link rotates (clockwise in FIG. 11C), the second link 720 connected to the first link 710 also rotates. The entire second link 720 moves while one end of the second link 720 moves along the other end of the first link 710. In addition, the claw restraint pin 721 installed at the other end of the second link 720 moves along the claw restraint pin guide groove 630, and the claw restraint pin 721 contacts the operating surface 440 of the claw 400. When the drive motor 310 continuously operates, the claw restraint pin 721 continues to push the operating surface 440 to rotate the claw 400. When the claw 400 restrains the striker 200, the half lock state becomes the full lock state where the claw 400 completely restrains the striker 200. In the full lock state, as the pawl 500 rotates toward the claw 400, the stopper 510 of the pawl 500 contacts the full lock stop surface 430 of the claw 400 to maintain the full lock state.

FIGS. 12A to 12C show a state upon interruption during the closing process of the opening and closing member.

FIG. 12A is a diagram showing a state where the opening and closing member starts to close from the state where the opening and closing member has been open and the striker 200 contacts the claw 400, as in FIG. 11A. In this state, when the user operates a button installed in the vehicle, or operates a button of a smart key, the opening and closing member starts to close, and reaches a half lock state as shown in FIG. 12B.

At this time, when the user again opens the opening and closing member by operating the button of the vehicle or the button of the smart key, or operates the emergency handle installed in the opening and closing member, the drive motor 310 rotates in the same direction as the opening of the opening and closing member to move the cinching-release pin 352 to the outside, and as in the opening, rotates the error lever 600 and the pawl 500 to be spaced apart from the claw 400. When the pawl 500 is spaced apart from the claw 400, the claw 400 again releases the restraint of the striker 200 while being rotated by the elastic force. Accordingly, the opening and closing member may be opened again.

What is claimed is:

1. A latch assembly for opening and closing a luggage room of a vehicle, the latch assembly comprising:
a base installed on an end portion of an opening and closing member configured to open and close the luggage room of the vehicle, and having a striker fixed to a vehicle body of the vehicle;

a power conversion mechanism configured to convert a rotational force of a drive motor into at least one linear motion;

a claw configured to grip and restrain the striker when the opening and closing member closes the luggage room;

a pawl configured to inhibit rotation of the claw so that the claw maintains a state of having the striker restrained;

an error lever installed to rotate with the pawl and configured to rotate so that the pawl is separated from the claw when the power conversion mechanism converts the rotational force of the drive motor into the at least one linear motion; and a link mechanism configured to rotate the claw so that the claw grips the striker, when the power conversion mechanism converts the rotational force of the drive motor into the at least one linear motion, wherein the power conversion mechanism comprises:

a screw shaft configured to be rotated by the drive motor; and a holder which is screw-coupled to the screw shaft and configured to rotate the error lever while moving along an axial direction of the screw shaft, wherein the holder is formed with a cinching-release pin, and the cinching-release pin is configured to:

contact the error lever to push the error lever to be spaced apart from the claw for releasing the striker, and push and rotate a first link of the link mechanism so that the claw reaches a full lock state, where the claw fully restrains the striker, from a half lock state, and wherein the error lever is formed with a claw restraint pin guide groove that accommodates a claw restraint pin, wherein when the claw restraint pin is disposed within the claw restraint pin guide groove, the claw restraint pin is disposed outside of the claw or contacts the claw to rotate the claw to grip the striker.

2. The latch assembly of claim 1,
wherein the link mechanism comprises:
the first link having a first end rotatably installed around a rotary shaft of the claw; and
a second link having a first end hinge-connected to a second end of the first link.

3. The latch assembly of claim 2,
wherein the second link has a second end elastically supported toward an inside of the claw, and
wherein the second link has a claw restraint pin installed at the second end of the second link.

4. The latch assembly of claim 1,
wherein a rotary shaft of the drive motor and the screw shaft are disposed in parallel with each other.

5. The latch assembly of claim 1,
wherein the base includes a guide member configured to guide a linear motion of the cinching-release pin.

6. The latch assembly of claim 5,
wherein the guide member is a guide plate, and a cinching-release pin guide groove is formed in the guide plate and configured to guide the cinching-release pin.

7. The latch assembly of claim 5,
wherein the guide member is a motor housing fastened to the base, and formed with a slot along the axial direction of the screw shaft so as to guide the cinching-release pin while covering the drive motor.

8. The latch assembly of claim 1,
wherein the error lever is formed with a bent part on which the cinching-release pin contacts to separate the pawl from the claw and release the striker.

9. The latch assembly of claim 1,
wherein the first link of the link mechanism is formed with a contact part, and the cinching-release pin pushes the contact part to rotate the first link, such that the claw reaches the full lock state from the half lock state.

10. The latch assembly of claim 9,
wherein the claw is formed with an operating surface contacting a claw restraint pin, such that the claw restraint pin rotates the claw to the full lock state from the half lock state.

11. The latch assembly of claim 1,
wherein when the claw reaches an off state where the striker is separated from the claw through the half lock state from the full lock state, or
the claw reaches the full lock state through the half lock state from the off state,
the drive motor moves the cinching-release pin to an original position.

12. The latch assembly of claim 1,
wherein an end portion of the pawl, spaced apart from the claw, is formed with a bent locking part,
wherein an outside end portion of the error lever is formed with an operating part contacting the bent locking part when the error lever rotates outwards from the claw,
wherein the operating part pushes the bent locking part to rotate the pawl so as to separate the pawl from the claw, thereby releasing the striker from the claw, and
wherein the bent locking part pushes the operating part to rotate the error lever when the claw fully restrains the striker.

13. The latch assembly of claim 1,
wherein the drive motor is fixed inside the base, and
wherein the drive motor engages with the power conversion mechanism at an end portion of the base.

14. The latch assembly of claim 1,
wherein the base is provided with at least one switch configured to sense a rotating state of the claw.

* * * * *